(12) United States Patent
Chen

(10) Patent No.: US 6,219,419 B1
(45) Date of Patent: Apr. 17, 2001

(54) STICKER SHIELDING AGAINST ELECTROMAGNETIC WAVE

(75) Inventor: Simon Chen, Taipei (TW)

(73) Assignee: Asiatic Fiber Corporation, Taipei (TW)

( * ) Notice: Subject to any disclaimer, the term of this patent is extended or adjusted under 35 U.S.C. 154(b) by 0 days.

(21) Appl. No.: 09/084,395

(22) Filed: May 27, 1998

(51) Int. Cl.[7] .......................................... H04M 1/00
(52) U.S. Cl. ................................ 379/452; 379/439
(58) Field of Search ............................. 379/452, 437, 379/439, 451, 447; 455/117, 128, 129, 90

(56) References Cited

U.S. PATENT DOCUMENTS 2,507,375 * 5/1950 Hartwell et al. ...................... 379/452
5,535,439 * 7/1996 Katz ..................................... 455/117

* cited by examiner

Primary Examiner—Jack Chiang
(74) Attorney, Agent, or Firm—Browdy And Neimark

(57) ABSTRACT

A shielding sticker for use on a cellular phone against electromagnetic waves generated by the phone and having negative influence on a person using such a phone is made up of a conductive shielding screen and a conductive ring. The conductive shielding screen is woven by fiber reeled from a mixed material composed of carbon, lead and sodium. The conductive ring is made of a metal or non-mental material. The conductive shielding screen is adhered to the conductive ring by a conductive adhesive to produce an integral sticker shielding against electromagnetic waves produced by a cellular phone in operation.

6 Claims, 3 Drawing Sheets

STICKER SHIELDING AGAINST ELECTROMAGNETIC WAVE

BACKGROUND OF THE INVENTION

The present invention relates to a shielding sticker for use on cellular phones or household cordless phones to guard against electromagnetic waves generated by the phone and having negative influence on a person using such a phone. The sticker is made up of a conductive shielding screen and a conductive ring. The conductive shielding screen is woven by fiber reeled from a mixed material composed of carbon, lead and sodium. The conductive ring is made of a metal or non-mental material. The conductive shielding screen is adhered to the conductive ring by a conductive adhesive to produce an integral sticker shielding against electromagnetic waves produced by a cellular phone in operation.

Nowadays cellular phones have been popularly used in modem cities all over the world and become an indispensable equipment for many people frequently on the move. Household cordless phones are also employed in many families around the globe. Such electromagnetic wave operated phones provide so much facility to modem people but they are hazardously detrimental to human health.

According to medical studies conducted in western medical institutes in recent years, an astounding fact reveals that electromagnetic waves generated by cellular or cordless phones have negative influence on membranous cells or nerve fibers, making people slow in motion gradually in one aspect; and brain tumors are also attributed to long term exposure to environments full of electromagnetic waves. So, it is very important to filter electromagnetic waves in our living enviroments.

Moreover, common indoors cordless phones are also a mobile phone operated in ultra high frequencies ranging from 250 MHz to 380 Mhz. Microwaves are dangerous to human bodies; even 1 MHz is seriously threatening to human health, not to mention the ultra high frequencies of 250 MHz–380 MHz on which the cordless or cellular phones based. Household micro-ovens are used to heat foods, even weak microwaves can be harmful to people. Long term usage of cellular or cordless phones make people exposed to more dangerous situations without doubt.

SUMMARY OF THE INVENTION

Therefore, the primary object of the present invention is to provide a shielding sticker for use on a cellular phone to guard against electromagnetic wave, generated by a cellular phone in operation, by means of a woven screen made up of conductive fibers whereby electromagnetic wave can be stopped from entering the brain of a person via the ear to which the cellular phone is pressed against in receiving a call.

Another object of the present invention is to provide a shielding sticker which can be applied to various kinds of cellular phones or cordless phones.

One further object of the present invention is to provide a shielding sticker for use on a cellular phone guarding against electromagnetic wave which is equipped with a conductive ring produced in various shapes and made of fluorescent or light reflecting materials.

BRIEF DESCRIPTION OF THE DRAWINGS

FIG. 2A is an enlarged diagram showing the detailed structure of the conductive screen of the present invention;

DETAILED DESCRIPTION OF THE PREFERRED EMBODIMENT

Figure 1:
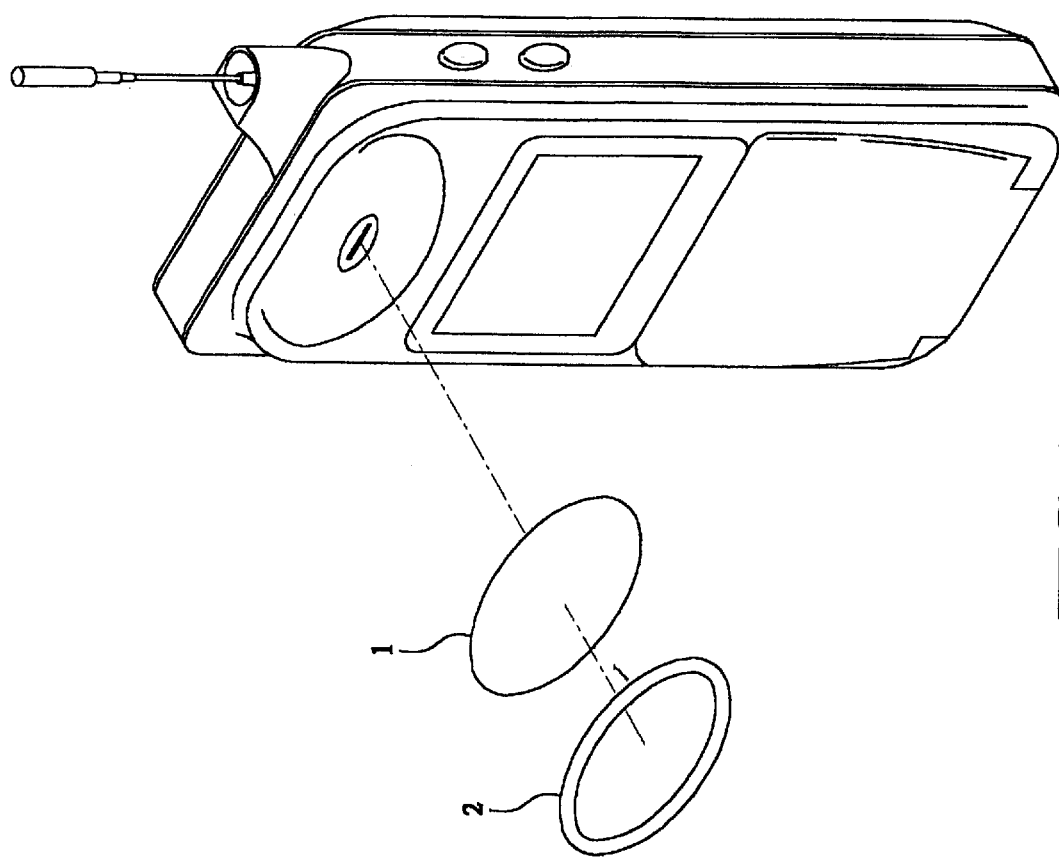
FIG. 1 is a diagram showing the shielding sticker of the present invention to be mounted to a cellular phone.
Figure 2:
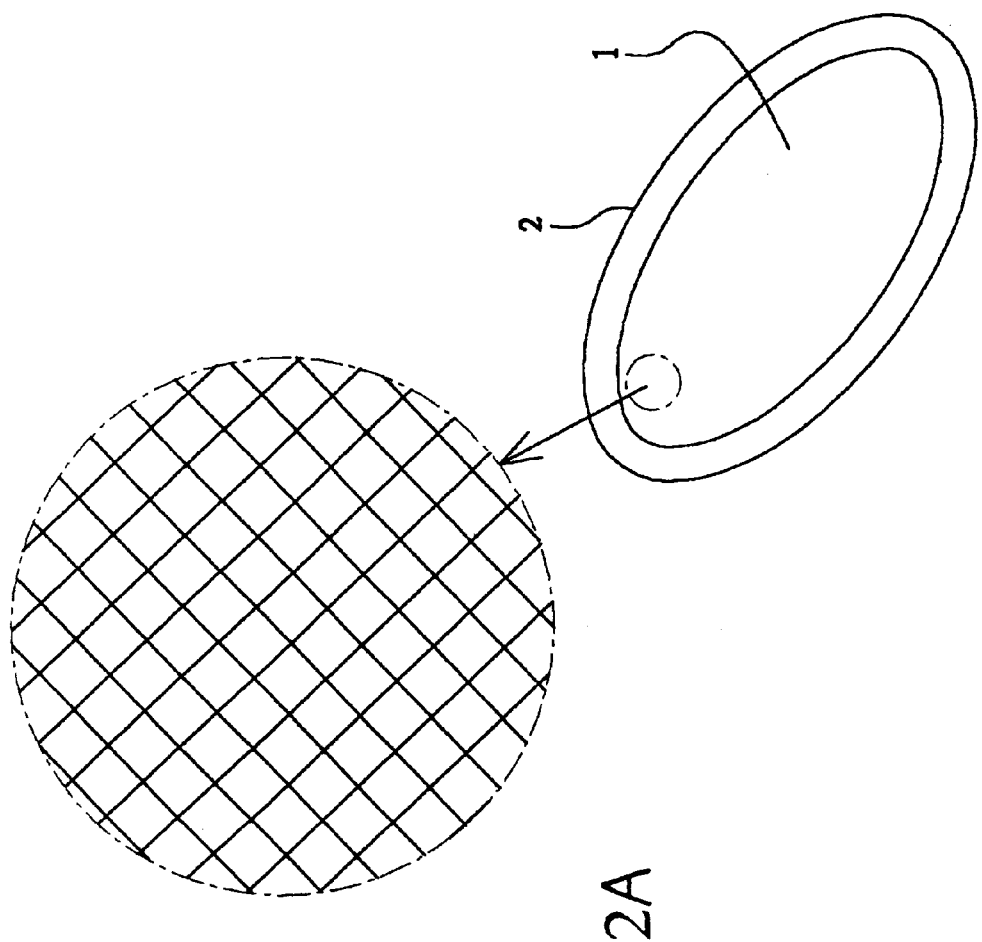
FIG. 2 is a diagram showing the integral shielding sticker thereof.

Referring to FIGS. 1, 2, the shielding sticker 10 of the present invention is comprised of a conductive shielding screen 1 and a conductive ring 2.

The conductive shielding screen 1 is an even and smooth circular member woven by fibers reeled from a material composed of carbon, lead and sodium. The whole process of production of the conductive shielding screen 1 includes the steps of fiber reeling, arranging fibers, weaving and management to produce the conductive shielding screen 1 which has a conductance of 106 G. The shielding screen 1 is engaged to the surface of the earphone of a cellular phone so as to filter 99% of the electromagnetic waves ranging from 100 MHz to 2000 MHz.

The conductive shielding screen 1 is fixedly engaged with the conductive ring 2 along the periphery thereof by way of conductive adhesive. The conductive ring 2 can be optionally made of metallic or non-metallic materials. The integral conductive shielding screen 1 is completely conductive in structure. So, the shielding sticker 10 can be mounted to a cellular or cordless phone to stop electromagnetic waves from influencing a human brain when a phone is in operation.

Figure 3:
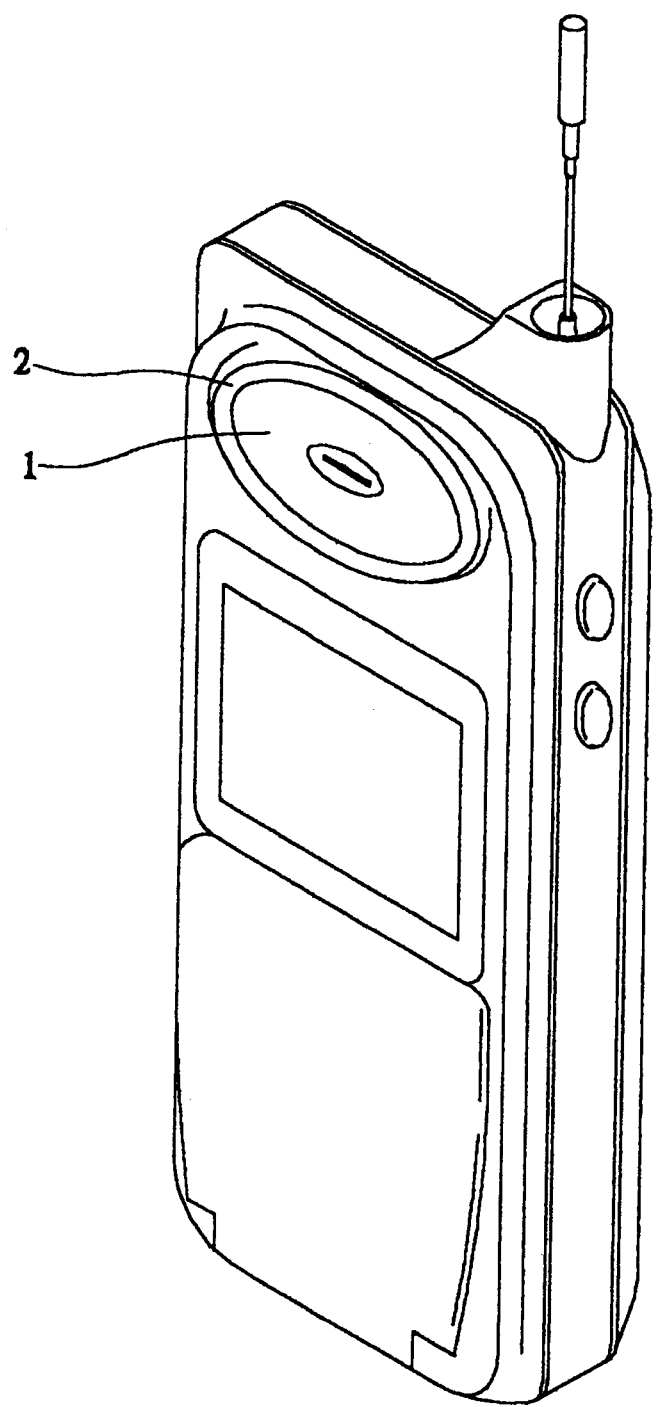
FIG. 3 is a diagram showing the mounting of the shielding sticker of the present invention to a cellular phone.

Referring to FIG. 3, one surface of the conductive screen 1 is coated with conductive adhesive so as to make it stick to the ear phone area of a cellular phone. When a cellular phone receiving a call is operated, 99% of the electromagnetic waves ranging from 700 MHz to 1900 MHz will be filtered and stopped by the conductive shielding screen 1 from entering the brain of a user via the ear in pressing conduct with a cellular phone. Ears and eyes are the parts of a human head mostly exposed without the protection of a skull, the conductive shielding screen can well protect the ears and filter 99% of the electromagnetic waves from entering a human brain via ears. Besides, a human body is a good conductance, so the filtered electromagnetic waves can be alleviated through the body.

The conductive shielding screen 1 can be made in a circular, elliptic shape or any other geometric shapes desired to conform to various shapes of ear phones of cellular phones so as to completely cover any ear phones to filter electromagnetic waves without dead spots. Besides, the conductive ring 2 of a smooth element with a thickness less than 1 mm is adhered to the conductive shielding screen 1 without affecting the normal operation of a cellular phone. The conductive ring can be made of fluorescent or light reflecting materials so as to make the shielding sticker appealing to the eyes.

Moreover, dust accumulated on an earphone of a cellular phone, causing the communication quality of a phone to be lowered can be stopped by the attached conductive shielding screen 1. The accumulated dust can be easily removed by cotton with alcohol which can naturally dissipated into air without residual. The conductive ring 2 can become shiningly bright by way of the wipe of alcohol cotton.

In summary, the advantages of the present invention are given as below:

1. The conductive shielding screen can be made in circular, elliptic or any other shapes so as to completely cover a recessed earphone without any dead spots.

2. The materials used produce the shielding screen have no influence on the quality of communication of a cellular phone.

3. It can be applied to various kinds of cellular phone with a decorative effect.

4. It has a permanent conductive effect which will not disappear as a result of cleaning.

I claim:

1. A shielding sticker for use on a recessed earphone of a cellular or cordless phone to filter out electromagnetic waves, comprising:

a conductive shielding screen, and a conductive ring, the conductive shielding screen being woven from a mixture of carbon, lead and sodium fibers to filter out 99% of electromagnetic waves ranging from 100 MHg to 2000 MHg passing through the screen;

the conductive ring being fixed to a periphery of the conductive shielding screen by a conductive adhesive; and wherein the sticker is limited to engagement with the recessed earphone of the cellular or cordless phone.

2. The shielding sticker according to claim 1, wherein the sticker is circular.

3. The shielding sticker according to claim 1, wherein the sticker is elliptic.

4. The shielding sticker according to claim 2, wherein the conductive ring is made of light reflecting material.

5. The shielding sticker according to claim 1, wherein the conductive ring is made of fluorescent reflecting material.

6. The shielding sticker according to claim 1, wherein the conductive shielding screen has a conductive of approximately 106 G.

* * * * *